United States Patent [19]

Knill

[11] Patent Number: 5,950,159
[45] Date of Patent: Sep. 7, 1999

[54] WORD SPOTTING USING BOTH FILLER AND PHONE RECOGNITION

[75] Inventor: Katherine Mary Knill, Mountain View, Calif.

[73] Assignee: Hewlett-Packard Company, Palo Alto, Calif.

[21] Appl. No.: 08/818,646

[22] Filed: Mar. 19, 1997

[30] Foreign Application Priority Data

Apr. 1, 1996 [EP] European Pat. Off. .............. 96302320

[51] Int. Cl.[6] .............................. G10L 5/06; G10L 7/08; G10L 9/06
[52] U.S. Cl. .......................... 704/251; 704/233; 704/253
[58] Field of Search ................................... 704/253, 252, 704/256, 243, 251, 255, 233

[56] References Cited

U.S. PATENT DOCUMENTS

| | | | |
|---|---|---|---|
| 4,977,599 | 12/1990 | Bahl et al. | 704/256 |
| 5,199,077 | 3/1993 | Wilcox et al. | 381/43 |
| 5,218,668 | 6/1993 | Higgins et al. | 395/2 |
| 5,440,662 | 8/1995 | Sukkar | 704/256 |
| 5,526,463 | 6/1996 | Gillick et al. | 395/2.6 |
| 5,649,057 | 7/1997 | Lee et al. | 704/256 |

OTHER PUBLICATIONS

Manos et al. A Segment–Based Wordspotter Using Phonetic Filler Models. IEEE Conference on Acoustics, Speech and Signal Processing. vol. 2, 1997.

Rahim et al. Discriminative Utterance Verification for Connected Digits Recognition. IEEE Transactions on Speech and Audio Processing, vol. 5, No. 3, May 1997.

Wilpon et al. Automatic Recognition of Keywords in Unconstrained Speech Using Hidden Markov Models. IEEE Transactions on Acoustics, Speech and Signal Processing. vol. 38, No. 11, Nov. 1990.

Proceedings of the International Conference on Spoken Language Processing (ICSLP 90), Nov. 18–22, 1990, vol. 1 of 2, pp. 253–256, J. M. Koo et al., "A Recognition Time Reduction Algorithm for Large–Vocabulary Speech Recognition".

Proceedings of the International Conference on Acoustics, Speech, and Signal Processing: Speech Processing 1 (ICASSP–94), 1994, pp. 377–380, D. A. James et al., "A Fast Lattice–Based Approach to Vocabulary Independent Wordspotting".

IEEE Transactions on Acoustics, Speech, and Signal Processing, vol. 31, No. 5, Oct. 1983, pp. 1061–1066, T. Kaneko et al., "A Hierarchical Decision Approach to Large–Vocabulary Discrete Utterance Recognition".

Speech Processing 1 (ICASSP 90), Apr. 3–6, 1990, vol. 1, pp. 129–132, R. C. Rose et al., "A Hidden Markov Model Based Keyword Recognition System".

Cambridge University Department of Engineering Technical Report, Oct. 1994, pp. A,B, 1–17, K. M. Knill et al., "Speaker Dependent Keyword Spotting for Accessing Stored Speech".

*Primary Examiner*—David R. Hudspeth
*Assistant Examiner*—M. David Sofocleous

[57] ABSTRACT

The present invention relates to a word-spotting system and a method for finding a keyword in ascoustic data. The method includes a filler recognition phase and a keyword recognition phase wherein: during the filler recognition phase the acoustic data is processed to identify phones and to generate temporal delimiters and likelihood scores for the phones; during the keyword recognition phase, the acoustic data is processed to identify instances of a specified keyword including a sequence of phones; wherein the temporal delimiters and likelihood scores generated in the filler recognition phase are used in the keyword recognition phase.

10 Claims, 4 Drawing Sheets

KEYWORD: f ay n d

WORD SPOTTING USING BOTH FILLER AND PHONE RECOGNITION

TECHNICAL FIELD

The present invention relates toward-spotting in audio documents. An 'audio document' comprises electronically stored acoustic data. Fast processing is very important when searching an audio document for a keyword since the user expects to receive the results of a keyword search many times faster than the real-time duration of the speech.

BACKGROUND ART

The message domain of many word-spotting applications, such as personal memo and dictation retrieval, tends to be very user-specific and liable to change over time. An unrestricted keyword vocabulary is therefore important to allow the user to search for any term in the audio database. However, if an unrestricted keyword set is used, the location of keyword hits in the speech data cannot be determined in advance of a keyword retrieval request. Since the user expects to receive the results of a keyword search in a reasonably short time, the retrieval process must operate much faster than the actual length of the speech. For example, to achieve a response of three seconds for one minute of speech data, the processing needs to be twenty times faster than real-time.

It is well-known in speech processing to use Hidden Markov Models to model acoustic data. A textbook on the topic is "Readings in Speech Recognition" by A. Waibel and K. F. Lee; Palo Alto: Morgan Kaufmann.

There are known fast implementation approaches, such as lattice-based word-spotting systems of the type described in the paper by James, D. A. and Young, S. J. entitled "A fast lattice-based approach to vocabulary independent wordspotting", Proc ICASSP' 94, Adelaide, 1994, but these require a large amount of memory for lattice storage.

Less memory intensive word-spotting techniques are required for implementation in low-cost, portable devices where memory space is restricted.

A known alternative approach is to search the acoustic data directly, rather than using a lattice model. A 'filler model' and a 'keyword model' are used together to identify the locations of putative keywords in the acoustic data. This known approach is described in more detail with reference to FIG. 1.

The present invention aims to provide a method for finding a keyword in acoustic data which is faster than known methods as well as being memory-efficient.

The term 'phone' is used in this specification to denote a small unit of speech. Often, a phone will be a phoneme but may not always comply with the strict definition of phoneme used in the field of speech recognition.

SUMMARY OF THE INVENTION

According to the present invention we provide a method for finding a keyword in acoustic data, the method comprising a filler recognition phase and a subsequently occurring keyword recognition phase.

The acoustic data is processed during the filler recognition phase to identify phones and to generate temporal delimiters within the acoustic data and likelihood scores for the phones. Threafter, the acoustic data is processed during the keyword recognition phase to identify instances of a specified keyword comprising a sequence of phones. The temporal delimiters restrict the search space for instances of a keyword and the likelihood scores generated in the filler recognition phase are used in the keyword recognition phase.

The method of the present invention provides fast retrieval of keywords without intensive use of memory.

Preferably, keyword recognition is performed only for portions of the acoustic data when at least one of the keyword phones is present in the related filler phone sequence.

This feature entails the use of approximate matching techniques which speed up the word-spotting search at run-time without degrading performance. In the embodiment to be described, said portions of the acoustic data are identified by string matching the keyword phone string against the acoustic data. The string matching is performed using dynamic programming alignment.

BRIEF DESCRIPTION OF DRAWINGS

A specific embodiment of the present invention will now be described, by way of example, with reference to the accompanying drawings of which.

DETAILED DESCRIPTION OF THE INVENTION

First, a known method of finding a keyword in acoustic data will be described. The term 'filler' is used widely in the speech recognition field to refer to audio data which does not contain a keyword.

The use of Hidden Markov Models ('HMM's) to represent phones, words and higher level structures underlies much of the speech recognition research field and is well-known and will not be described in detail here. There are several alternative phone sets for representing speech data—a relatively simple commonly used classification includes 43 possible phones. Each phone is represented by an HMM which can be represented as having a number of states reflecting the sound during different stages of uttering the phone and/or differences in sound depending on the affect of pronouncing the preceding and following phones.

Figure 1:
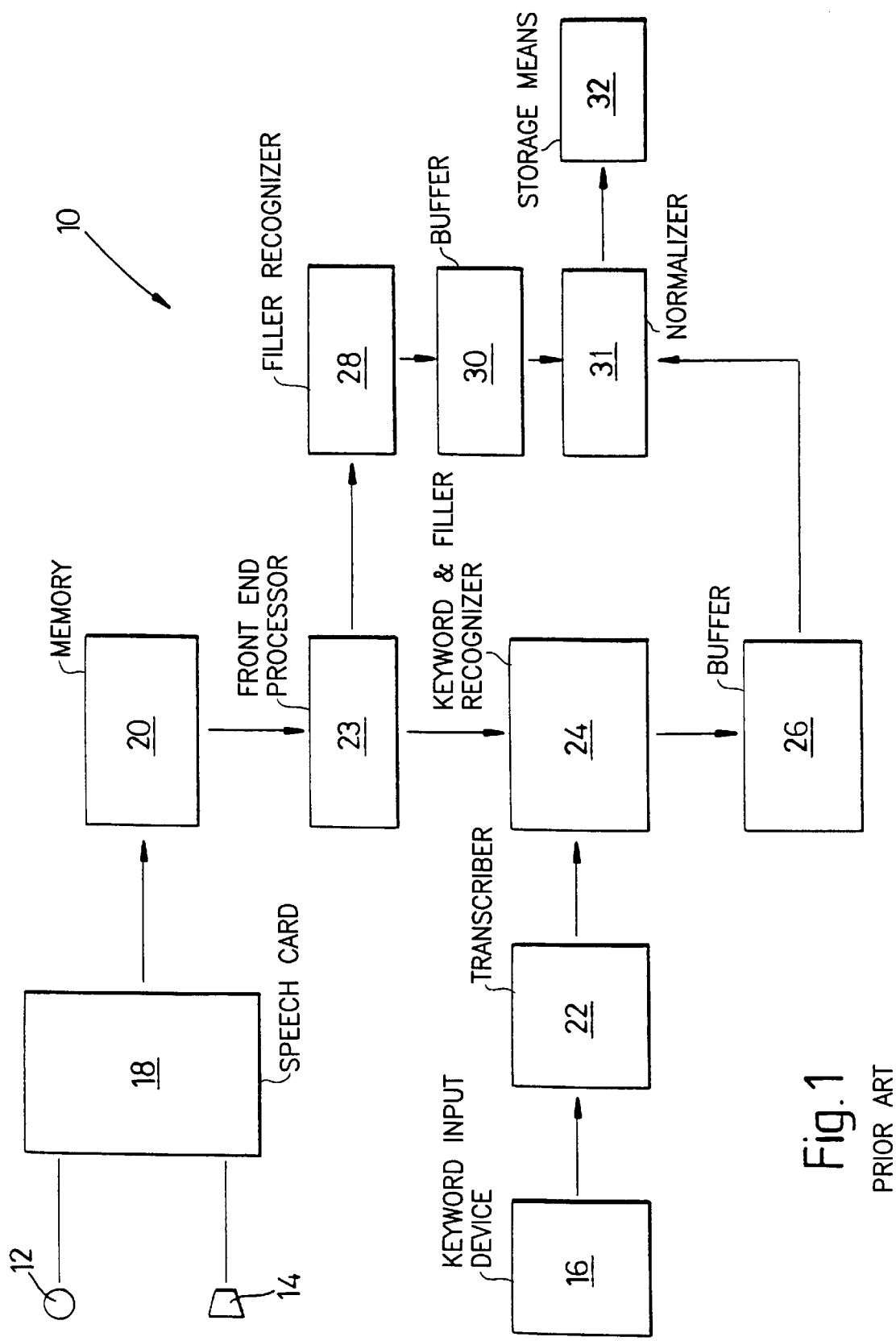
FIG. 1 shows a system implementing a known method for finding a keyword in acoustic data.

Referring to FIG. 1, a computer system 10 for word-spotting in audio documents comprises:

a speech input device 12, such as a microphone or a telephone link, for receiving speech input;

a speaker 14 for providing audio output;

a keyword input device 16, such as a keyboard;

a speech card 18 for creating fixed length digital speech frames from the analogue audio input;

memory means 20 for storing an 'audio document' in the form provided by the speech card 18;

a transcriber 22 for transcribing a keyword into a set of phones;

a front end processor 23;

a keyword and filler recognizer 24;

a buffer 26 for storing the output from the recognizer 24;

a filler recognizer 28;

a buffer 30 for storing the output of the filler recognizer 28;

a normalizer 31;

means 32 for storing the output of the results of the word-spotting process.

A keyword search is initiated when a user inputs a keyword to the system using the keyword input device 16. The keyword input device may simply be a keyboard to allow the user to make textual input or it could be a microphone if the system can identify spoken keywords. If the keyword set is unrestricted, the current state of speech recognition technology means that textual input is the most feasible implementation. The simplest approach to implement is one where the user is provided with a set of codes representing each of the possible phones in the set of phones. For example, part of the set could be:

accountant=/ak/ /k/ /aw/ /n/ /t/ /ax/ /n/ /t/

Using the above approach, the transcriber 22 is not needed because the user inputs phones directly. An alternative approach is for the user to type the keyword in the normal way and for the transcriber 22 to convert the ASCII codes into phones using a stored dictionary. A product that includes this functionality is the 'Waves' development environment from Entropic Research Laboratory, Cambridge, Mass., USA.

The paper of Aug. 3, 1995 entitled "Techniques for automatically transcribing unknown keywords for open keyword set HMM-based word-spotting" by K. M. Knill and S. J. Young of the Cambridge University Engineering Dept describes how to derive a keyword phone sequence from spoken input.

Whatever approach is used, a concatenated string of phone HMMs, the 'keyword phone string', is generated to represent the keyword. The system 10 uses a one-to-one look-up table for converting phones to HMMs.

The front end processor 23 provides a parametererized version of the audio document in a form suitable for use by the recognizers 24 and 28.

Two recognition passes are run in the known word-spotting system 10 of FIG. 1. In the first, combined keyword and filler recognition is performed by the keyword and filler recognizer 24 to determine putative keyword hits. The keyword and filler recognizer 24 takes as its input the parameterised version of the audio document from the front end processor 23 and the keyword phone string. The keyword and filler recognizer 24 is a software module which applies the set of filler HMMs and the sequence of keyword HMMs to the audio data in order to map the audio data to a sequence of filler phones and keywords (if one or more instances of the keyword are found to be present) together with likelihood scores for each filler phone and keyword instance.

Figure 2:
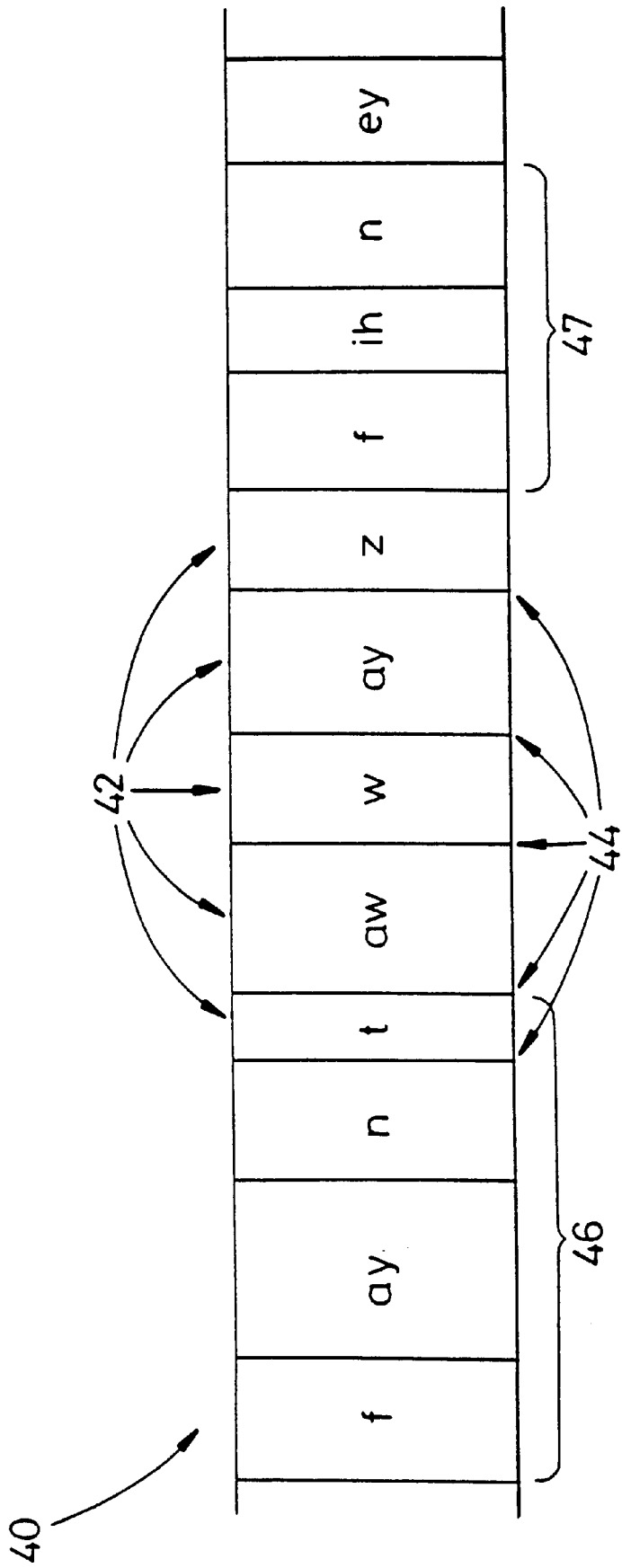
FIG. 2 is a schematic representation of the output of the keyword and filler recogniser 24 of FIG. 1.

The output of the keyword and filler recognizer 24 is a list of keyword locations in the audio data ie. the locations 46 and 47 indicated in FIG. 2 where the given keyword is 'find' which translates to the phones 'f/ay/n/d'. For each keyword instance, a likelihood score C is generated indicating the degree of certainty attached to the identification given to that part of the audio data.

The output of the keyword and filler recognizer 24 is stored in the buffer 26. This can be used as the output of the system to identify the location(s) of keywords (if any) in the audio document. One approach is to commence playback of the audio data through the speaker 14 from just before the location of the keyword instance with the highest likelihood score. Further playbacks can be made from the location of keyword instances with progressively lower likelihood scores until the user halts the process. There are many and varied possible ways of presenting the output from the word-spotting process and the chosen approach will depend on the application for which the particular system is to be used.

Optionally, a further processing cycle may be performed on the audio document to improve the accuracy of the results. The filler recognizer 28 is used to process the data in the audio document and translate it into HMMs representing filler phones, as indicated in FIG. 2 (without the keyword instances). The filler recognizer 28 segments the audio data 40 into phones 42, each with temporal delimiters 44. Again, for each phone 42, a likelihood score C' is generated indicating the degree of certainty attached to the indentification given to that part of the audio data.

The normalizer 31 compares the filler likelihood scores C' and the likelihood scores C generated by the keyword and filler recognizer, and this gives an improvement in the accuracy of the results. This approach is described in the paper by R. C. Rose and D. B. Paul entitled "A hidden Markov model based keyword recognition system", Proc ICASSP, S2.24, pp129–132, Albuquerque, April 1990 and the paper by Knill, K. M. and Young, S. J. entitled "Speaker Dependent Keyword Spotting for Accessing Stored Speech", Cambridge University Engineering Dept., Tech. Report No. CUED/F-INFENG/TR 193, 1994. The maximum likelihood keyword scores are divided by the average filler phone likelihood scores over the same time frames.

Since the filler-only recognition is keyword independent, it can be applied in advance when the audio data is recorded, so that only the keyword and filler recognizer 24 has to be run when a keyword search request is received.

A disadvantage of the above-described approach is that it involves a large amount of duplication of computing effort in performing the two recognition processes as described and is therefore relatively slow.

An embodiment of the present invention will now be described with reference to FIGS. 3, 4 and 5.

Figure 3:
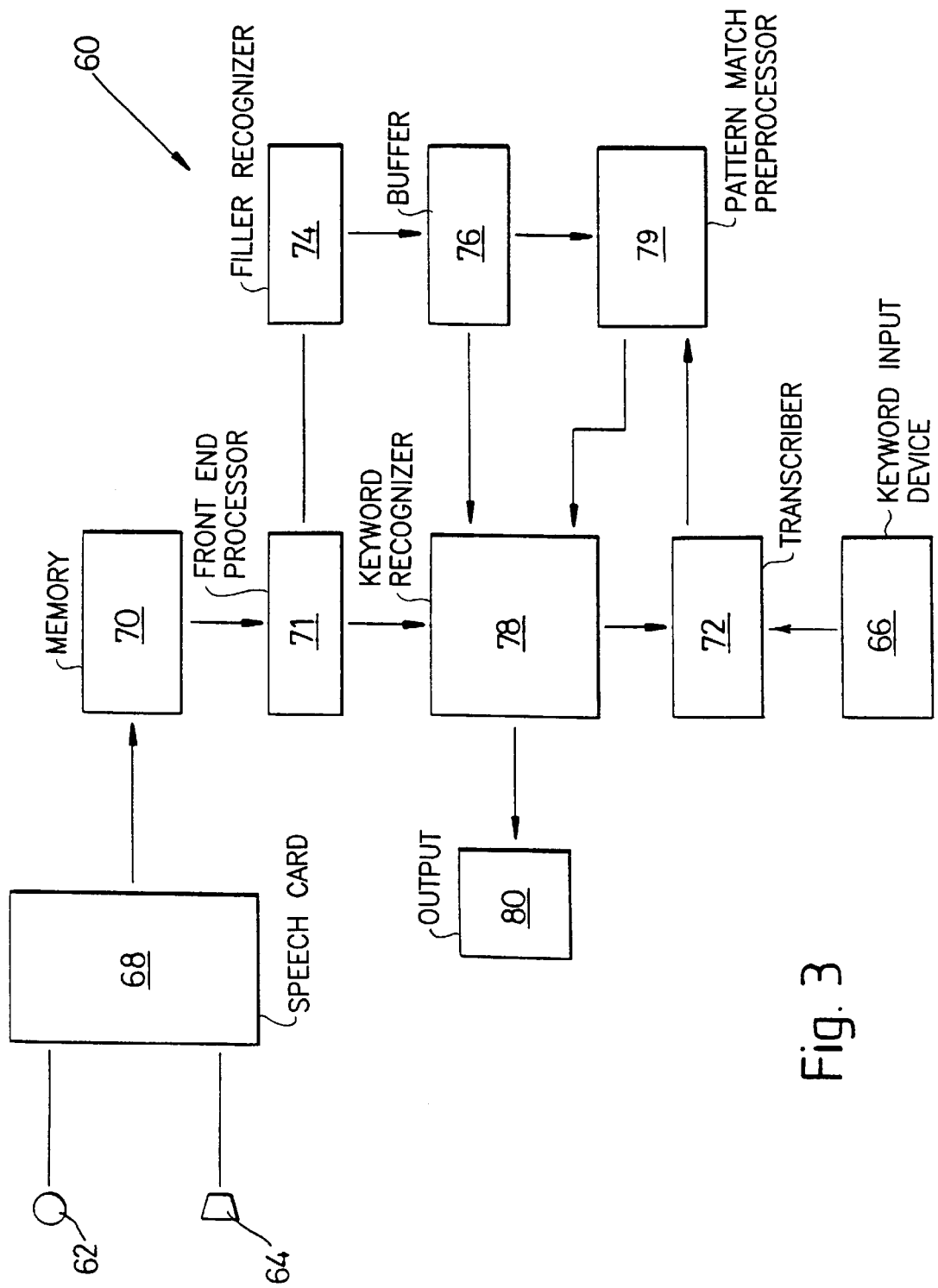
FIG. 3 shows a system implementing a method according to the present invention for finding a keyword in acoustic data.

Referring to FIG. 3, a word-spotting system 60 comprises:

a speech input device 62, such as a microphone or a telephone link, for receiving speech input;

a speaker 64 for providing audio output;

a keyword input device 66, such as a keyboard;

a speech card 68 for creating fixed length digital speech frames from the analogue audio input;

memory means 70 for storing an 'audio document' in the form provided by the speech card 68;

a front end processor 71;

a transcriber 72 for transcribing a keyword into a set of phones;

a filler recognizer 74;

a buffer 76 for storing the output of the filler reconizer 74;

a keyword recognizer 78;

a pattern matching pre-processor 79;

means 80 for outputting the results of the word-spotting process.

The components 62, 64, 66, 68, 70, 71, 72, 74, 76 and 80 perform a similar function to their counterparts in FIG. 1 and will therefore not be redescribed.

The system 60 performs a filler recognition pass on the audio document to translate it into a sequence of filler phones together with temporal delimiters and likelihood scores as illustrated in FIG. 2 and described above in relation to the known system of FIG. 1. Again, since the filler-only recognition is keyword independent, it can be applied in advance when the audio data is recorded.

When a keyword search is requested and a keyword is put into the system, the keyword recognizer 78 is activated to perform keyword recognition on the audio document. The keyword recognizer takes as its input both the parameterised form of the audio document provided by the front end processor 71, the keyword phone string from the transcriber 72 and the output of the filler recognizer 74 together with commands from the pattern matching pre-processor 79.

The duplication of computational effort involved in the known system of FIG. 1 can be greatly reduced if, instead of calculating the likelihood scores for filler HMMs a second time, only the likelihood score over the keyword frames is calculated by the keyword recognizer 78. This assumes that the keyword likelihood score is not affected by the identity of the surrounding phones.

e.g. the likelihood score for a keyword between speech frames f(1) and f(2) in the audio data is:

$$\log l(keyword) = \log l(o_f, \ldots, o_{f(2)}|keyword) - \log l(o_{f(0)}, \ldots, o_{f(1)}|filler)$$

where l represents likelihood and o represents an input observation vector ie. a set of parameters representing a frame of speech data, and where $\log l(o_{f(0)}, \ldots, o_{f(1)}|filler)$ is the optimal filler path log-likelihood score up to frame f(1). The latter has been calculated by the filler recognizer 74. If the addition of a keyword is assumed not to affect the likelihood scores of keyword matches elsewhere in the same path (where 'path' is the term used in the field to mean a time-aligned sequence of HMMs forming a hypothesis about what was said to generate the relevant speech data), then only the keyword frame likelihood scores need to be calculated by the keyword recognizer 78. This requires the storage of the log-likelihood of the optimal filler path from f(0) to each speech frame, {f(i);i=1, ..., T}, in the audio document, as calculated by the filler recognizer 74, ie. T likelihood scores must be stored.

This feature permits a significant reduction in the computation required to be performed by the keyword recognizer 78.

To further reduce the memory requirements and computation cost, the assumption is made that the temporal delimiters indicating the phone transition boundaries in the keyword recognition phase are identical to those established in the filler recognition phase. This enables the output of the filler recognition phase to provide index points in the audio data for keyword recognition.

Figure 4:
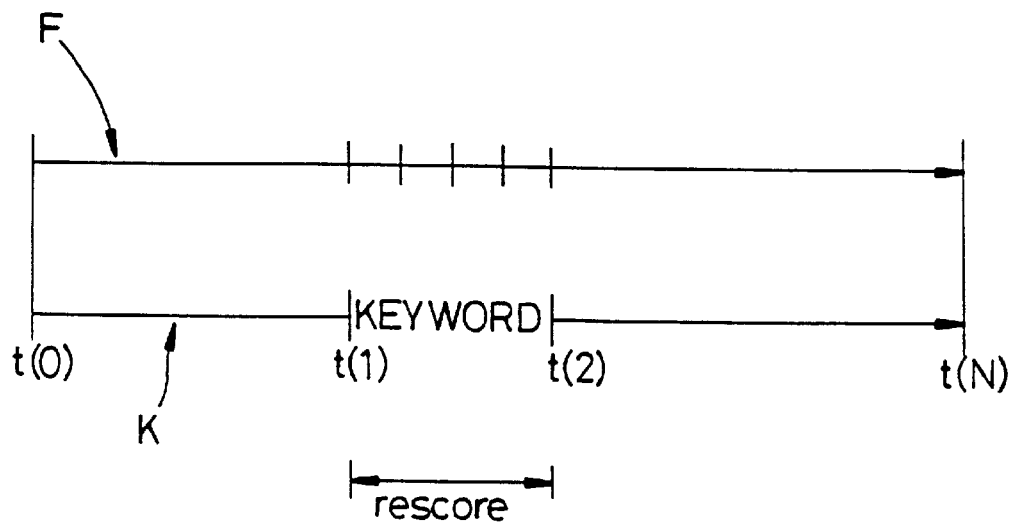
FIG. 4 shows a single keyword in a keyword recognition pass.

As stated above, since the likelihood score up to a temporal delimiter t(1) is known, the only requirement is to calculate the likelihood score for the keyword starting at t(1) and finishing at t(2), where t(2)>t(1) are phone boundaries in the filler path, as illustrated in FIG. 4. In FIG. 4, the upper line is represents the filler path F and the lower line represents the keyword path K. Since the likelihood scores and temporal delimiters are recorded at the phone level, the maximum number of temporal delimiters possible is T/3 for 3-state phone models. The amount of storage required is therefore reduced by at least two thirds. Fewer computations are also required in the keyword recognition phase.

A further feature of the present invention is the use of approximate pattern matching techniques in order to speed up the search but without degrading performance. The temporal delimiters derived in the filler recognition phase define the intervals in the audio data at which matching can occur. The keyword phone string is matched against successive portions of the audio document. The keyword phone string can be viewed as a window which moves across the audio data in order to find the best match.

Rather than applying the keyword recognizer 78 to all possible window positions, the keyword recognizer 78 is applied instead to a subset of these. This increases the speed of the keyword recognition process. Since the same HMM set is used for the keyword phone string as in the filler phones, the phone label information from the filler recognition phase can be used to determine which segments of the speech are likely to contain a keyword (see FIG. 2). The pattern matching pre-processor 79 is operable to select a subset of the delimited portions of the audio data reflected in the output of the filler recognizer 74 for keyword recognition. This is done by scanning the audio data for matches, or partial matches, of the keyword phone string. The keyword recognizer 78 is then only applied to those frames that lie within matched segments. The simplest criterion to use for a match is to force the recognised string and keyword string to be identical. However, the number of matches found in this way would be very small due to recognition errors, so instead a partial match criterion is required.

The pattern matching pre-processor 79 uses dynamic programming to perform the string matching. Dynamic programming is a well-known matching technique and will not be described in detail here. Penalties for substitution, deletion and insertion are used in the dynamic programming alignment algorithm. The penalties can either be fixed or be phone dependent. There are many papers and books on the topic of dynamic programming, for example "Time warps, string edits and macromolecules: the theory and practice of sequence comparison" by D. Sankoff and J. B. Kruskal, 1983, published by Addison Wesley.

The keyword phone string is matched successively along the audio data using the temporal delimiters derived in the filler recognition phase. The matching is done by initially aligning with the first temporal delimiter, then aligning with the second temporal delimiter and so on until the last temporal delimiter. The positions of the best dynamic programming alignments are stored provided at least one phone match between the two strings (ie. the keyword phone string and the phone string in the output of the filler recognizer to which it is being compared) is recorded.

Figure 5:
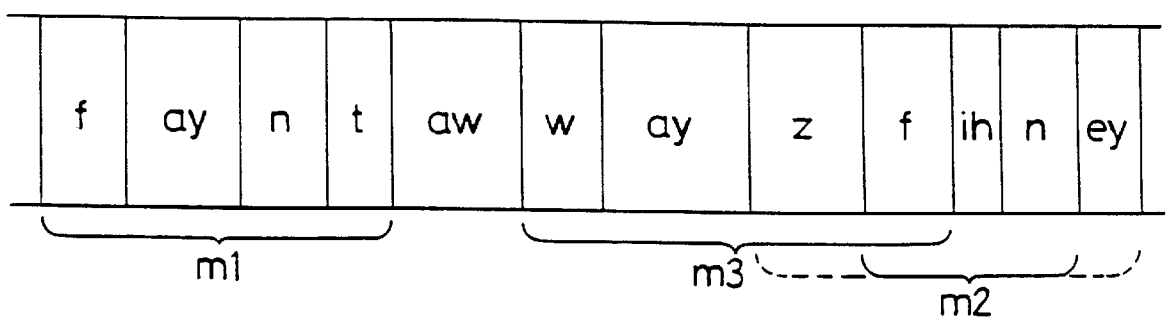
FIG. 5 relates to the operation of the pattern matching pre-processor.

FIG. 5 shows the audio data bearing the labels resulting from the filler recognition phase and the keyword phone string. If only one phone match is required in the pattern matching process, the instances M1, M2 and M3 would be marked as possible keyword matches. (M1 and M2 correspond to keyword instances 46 and 47 indicated in FIG. 2.) The matching constraint can be tightened by increasing the minimum number of phone matches needed before the result of an alignment is stored. If two phone matches were required, only M1 and M2 would be recorded as matches worth progressing to the keyword recognition phase.

To try to ensure that the number of keyword frames eliminated erroneously is kept to a minimum, the endpoints of the dynamic programming match can be extended by one or more temporal delimiters, at the cost of increasing the search space. To limit the number of extra speech frames added to the keyword recognizer 78 search space, this extension is restricted to matches where there are fewer phones in the match alignment than the keyword string. In the present example therefore, only the match relating to the keyword instance M2 would be extended (to cover the neighbouring phones z and ey as indicated by dotted lines in FIG. 5) as this match has only three phones compared to four phones in the keyword phone string.

The keyword recognizer 78 then performs keyword recognition on the portions of the audio data marked by the pattern matching pre-processor 79. The keyword recognizer 78 outputs the locations of keyword instances in the audio data together with a likelihood score for each instance.

The word-spotting system of the present invention can be implemented using the token passing paradigm described in the paper by Young, S. J., Russell, N. H., and Thornton, J. H. S. entitled "Token Passing: a Simple Conceptual Model for Connected Speech Recognition Systems", Cambridge University Engineering Department, Tech. Report No. TR.38, July, 1989.

As in the system 10 of FIG. 1, there is also a normalisation process in the system 60, in which the keyword score is normalised by the filler recognition pass score to improve the rank order, and this can be performed within the recognizer 78. The keyword likelihood score per frame is normalised by the average filler likelihood score per frame over the same set of speech frames. A likelihood score threshold can then be applied to test if the keyword should be accepted.

When all the putative keyword hits have been calculated, they are ranked according to their normalised score. Overlapping keyword hits are eliminated by removing all the (lower scoring) keyword hits whose speech frames overlap those of the highest scoring keyword hit, and so on down the set of putative hits. The reduced ranked list is then passed by the recognizer 78 to the output means 80.

The present invention has been described in the context of a Viterbi decoder which is the standard type of decoder used in speech recognition applications. However, the invention is easily extendable to other types of decoders, such as decoders using the Baum-Welch forward/backward algorithm.

I claim:

1. A computer implemented method for finding a keyword in acoustic data, the method comprising a filler recognition phase and a keyword recognition phase that occurs subsequent to initiation of said filler recognition phase, comprising the steps of:

processing the acoustic data during the filler recognition phase to identify phones and to generate (i) temporal delimiters within said acoustic data and (ii) likelihood scores for the phones;

processing the acoustic data during the keyword recognition phase to identify instances of a specified keyword comprising a sequence of phones, said processing employing said temporal delimiters to restrict search space for instances of said specified keyword and further employing said likelihood scores generated in the filler recognition phase as an aid in the keyword recognition phase.

2. A method according to claim 1 wherein keyword recognition is performed only for portions of the acoustic data when at least one of the keyword phones is present in the related filler phone sequence.

3. A method according to claim 2 wherein said portions of the acoustic data are identified by string matching the keyword phone string against the acoustic data.

4. A method according to claim 3 wherein the string matching is performed using dynamic programming alignment.

5. The method according to claim 1, wherein said keyword recognition phase occurs subsequent to completion of said filler recognition phase.

6. A system for finding a keyword in acoustic data, the system employing a filler recognition phase and a keyword recognition phase that occurs subsequent to said initiation of said filler recognition phase and comprising:

a) means for processing the acoustic data during the filler recognition phase to identify phones and to generate a temporal delimiters for said acoustic data and likelihood scores for the phones; and b) means for processing the acoustic data during the keyword recognition phase, using the temporal delimiters to restrict search space for instances of said keyword and likelihood scores identitfied by means a), to identify instances of said keyword comprising a sequence of phones.

7. The system according to claim 6 wherein keyword recognition is performed by means b) only for portions of the acoustic data when at least one of the keyword phones is present in the related filler phone sequence.

8. A system according to claim 7 wherein said portions of the acoustic data are identified by means b) by string matching the keyword phone string against the acoustic data.

9. A system according to claim 8 wherein the string matching is performed using dynamic programming alignment.

10. The system according to claim 9, wherein said keyword recognition phase occurs subsequent to completion of said filler recognition phase.

\* \* \* \* \*